(12) United States Patent
Tsai et al.

(10) Patent No.: US 7,882,315 B2
(45) Date of Patent: Feb. 1, 2011

(54) SNAPSHOT MECHANISM IN A DATA PROCESSING SYSTEM AND METHOD AND APPARATUS THEREOF

(75) Inventors: Tsung-Lin Tsai, Kaohsiung (TW); Jun-Yao Wang, Tainan (TW); Shou-Jen Wey, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 1072 days.

(21) Appl. No.: 11/463,598

(22) Filed: Aug. 10, 2006

(65) Prior Publication Data

US 2007/0156985 A1 Jul. 5, 2007

(30) Foreign Application Priority Data

Dec. 30, 2005 (TW) ............................. 94147722 A

(51) Int. Cl.
*G06F 12/00* (2006.01)
*G06F 13/00* (2006.01)

(52) U.S. Cl. .................. 711/162; 711/100; 711/154; 711/163

(58) Field of Classification Search ............. 711/100, 711/154, 162, 163, 200
See application file for complete search history.

(56) References Cited

U.S. PATENT DOCUMENTS

| 6,594,744 | B1 | 7/2003 | Humlicek et al. | |
|---|---|---|---|---|
| 6,823,436 | B2* | 11/2004 | Krishnamurthy | 711/170 |
| 6,829,617 | B2 | 12/2004 | Sawdon et al. | |
| 6,895,415 | B1* | 5/2005 | Rezaul Islam et al. | 707/204 |
| 6,961,838 | B2 | 11/2005 | Reuter et al. | |
| 2004/0093474 | A1* | 5/2004 | Lin et al. | 711/162 |
| 2005/0027819 | A1* | 2/2005 | Nakano et al. | 709/217 |
| 2006/0041727 | A1* | 2/2006 | Adkins et al. | 711/162 |
| 2007/0083567 | A1* | 4/2007 | Arai et al. | 707/200 |
| 2008/0016293 | A1* | 1/2008 | Saika | 711/154 |
| 2008/0250215 | A1* | 10/2008 | Shitomi | 711/162 |
| 2008/0306907 | A1* | 12/2008 | Biswal et al. | 707/2 |

FOREIGN PATENT DOCUMENTS

TW        I222562        10/2004

OTHER PUBLICATIONS

"1st Office Action of Taiwanese counterpart application", issued on Jan. 17, 2009, p.1-p.7.

* cited by examiner

*Primary Examiner*—Tuan V. Thai
(74) *Attorney, Agent, or Firm*—Jianq Chyun IP Office

(57) ABSTRACT

A snapshot mechanism of a data processing system is provided herein. The snapshot mechanism includes providing a snapshot storage unit for storing the data created when snapshotting the target storage units and generating a plurality of snapshot images accordingly. Two different types of address tables in the snapshot image are used for corresponding to the storage units of the snapshot storage unit and the target storage units. The status of the target storage units can be recovered to the status at a predetermined time ago according to the snapshot images. The two types of address tables are respectively used for storing the data created by the data processing system and history data so as to prevent the data stored in the target storage units to be overwritten.

26 Claims, 10 Drawing Sheets

COW BITMAP TABLE

| (Chunk_ID) | (Device_ID) | (COW_Flag) | (Start_Block) | (Block_Length) |
|---|---|---|---|---|
| | | | | |

PRIMARY BITMAP TABLE TABLE

| (Chunk_ID) | (Device_ID) | (Start_Block) | (Block_Length) |
|---|---|---|---|
| | | | |

FIG. 5B

SNAPSHOT MECHANISM IN A DATA PROCESSING SYSTEM AND METHOD AND APPARATUS THEREOF

CROSS-REFERENCE TO RELATED APPLICATION

This application claims the priority benefit of Taiwan application serial no. 94147722, filed Dec. 30, 2005. All disclosure of the Taiwan application is incorporated herein by reference.

BACKGROUND OF THE INVENTION

1. Field of Invention

The present invention relates to a snapshot mechanism of a data processing system and the method and apparatus thereof. More particularly, the present invention relates to a snapshot mechanism of a data processing system and the method and apparatus thereof, which can reduce access time and storage space.

2. Description of Related Art

Data security is the essential requirement of data backup technology, and the original data is expected to be restored in case of physical damage of the storage hardware or data update error (including human error, software error, virus, or invasion of hacker). Thus, the storage process of creating only data mirror cannot resolve the problem completely; instead, the concept of version control has to be adopted in storage technology to restore the history data as expected by the user. The function of snapshot can achieve this requirement. The service is not terminated while performing snapshot function, thus the quality of service provided by the company can be improved, in addition, the backup window can be adjusted flexibly so as to perform snapshot processes in different frequencies according to different significances.

Copy-on-Write (referred to as "CoW" therein after) is the mainstream in snapshot executing methods because of its excellent flexibility and scalability (which means it can be applied to different systems). In consideration of the dependency of file system, snapshot is executed at block level, so that it can be applied to a broader range.

Regarding CoW technology, a manufacturer Redhat provides a snapshot technology which supports one-to-one snapshot as shown in FIG. 1. In this snapshot technology, every time a snapshot volume is set up for a logical volume. Each snapshot volume needs to reserve a space for storing the history data. It is checked that whether the original data in a chunk to be overwritten needs to be stored into the snapshot volume as history data whenever a writing operation is performed to the original logical volume. If not, the original data is copied to the snapshot volume to be kept for later data recovery. As shown in FIG. 1, if the snapshot function is to be performed at different time to the target volume 110, i.e. a particular logical volume, different snapshot volumes have to be set up, for example, the space reserved by the snapshot volume 120 in FIG. 1 is used for storing the history data at 10:00AM, and the reserved spaces of the other snapshot volumes 130, 140, and 150 are respectively used for storing the history data at 12:00AM, 2:00PM, and 4:00PM, and the snapshot process is performed along the time.

However, if the reserved space is not enough for storing the history data, then the snapshot volume is considered invalid and the data cannot be recovered later based on the snapshot volume. Thus, generally speaking, each snapshot volume has to be reserved with enough space in the snapshot technology provided by Redhat Company. The more snapshot volumes are set up for a logical volume, the more snapshot volumes the same history data has to be stored. In the snapshot technology provided by Redhat Company, regarding data recovery, the user can read the history data when she/he is connected to the snapshot volume, but the logical volume is not recovered to the original status when the snapshot volume was set up. However, it is convenient in the management of snapshot volumes because the deletion or updating to a particular snapshot volume will not affect the other snapshot volumes.

In addition, a snapshot technology is provided in the U.S. Pat. No. 6,594,744 with the title of "Managing a snapshot volume or one or more checkpoint volumes with multiple point-in-time images in a single repository" disclosed on 15$^{th}$, Jul. 2003 by LSI Logic Corporation. As shown in FIG. 2, each snapshot to a target volume is considered a partition, and all the partitions to the same target volume are integrated into a large snapshot volume. For example, each snapshot of the target volume 210 is stored into the snapshot volume 220 in sequence, for example, snapshots A, B, C, and D are respectively stored into the partitions A, B, C, and D of the same snapshot volume 220. Compared with the snapshot technology provided by Redhat Company, wherein the same history data has to be stored in many snapshots, this technology supports single snapshot volume storing multiple snapshot images.

In conventional snapshot technologies, including the two described above, for the convenience of management, a snapshot volume is generally created for the volume requiring backup for storing history data thereof, which will result in the history data being stored repeatedly and waste in time (coping multiple copies of history data) and space (too much reserved space and the space taken by the multiple copies of history data) since every snapshot volume has to reserve a space.

SUMMARY OF THE INVENTION

Accordingly, the present invention is directed to provide a snapshot technology, which can avoid waste in time (coping multiple copies of history data) and space (too much reserved space and space taken by the multiple copies of history data).

To achieve the aforementioned purpose, the present invention provides a snapshot mechanism in a data processing system. The snapshot mechanism includes providing a snapshot volume for storing the data created when snapshotting a plurality of target volumes and generating a plurality of snapshot images accordingly. A first address table and a second address table in a snapshot image are respectively used for corresponding to a plurality of storage units of the snapshot volume and the target volumes. The status of the target volumes is restored to a status at a predetermined time ago according to the snapshot images.

In the snapshot mechanism described above, the target volumes corresponding to the first address table are used for storing the data created by the data processing system, and the snapshot volume corresponding to the second address table is used for storing a plurality of history data so as to avoid overwriting the data stored in the target volumes.

The snapshot mechanism described above further includes a snapshot module used for managing the snapshot images and controlling the storage space of the snapshot volume. In an embodiment, the snapshot module can be a software module.

In the snapshot mechanism described above, when a write request is received, it is checked that whether the snapshot image of the target volume corresponding to the write request exists. It is also checked that whether the address of the storage unit in the second address table corresponding to the write request is updated, and if there is no any address updated in the second address table, a Copy-on-Write (CoW) process has to be performed to store the data stored in the storage unit corresponding to the write request into the snapshot volume and the address of the storage unit in the second address table which has not been updated is updated.

In the snapshot mechanism described above, when a read request for preview is received, a snapshot image is selected from the created snapshot images, then an original address corresponding to the read request is obtained from the first address table, and the address of a history data corresponding to the read request is obtained from the second address table. Data is captured from the storage unit of the target volume corresponding to the original address if the address of the history data has not been updated, and data is captured from the storage unit of the snapshot volume corresponding to the address of the history data if the address of the history data has been updated.

In the snapshot mechanism described above, when a recovery request is received, a snapshot image is selected from the created snapshot images, an original address corresponding to the recovery request is obtained from the first address table, and the address of a history data corresponding to the recovery request is obtained from the second address table. Next, the history data is obtained from the snapshot volume according to the address of the history data and written into the storage unit of the target volume corresponding to the original address.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5B is a diagram illustrating the composition of a primary bitmap table and a Removed history data CoW bitmap table according to an embodiment of the present invention.

DESCRIPTION OF EMBODIMENTS

The present invention provides a snapshot technology, wherein, through a snapshot module mechanism between a logical volume and a snapshot volume, the history data is controlled by the snapshot module and written into the snapshot volume while the logical volume initiates the CoW (Copy-on-Write) operation, or the history data is read from the snapshot volume and transmitted back to the logical volume when data recovery is performed.

The snapshot module can manage available storage units, including the storage units which can store data, on a snapshot volume, or write into the available storage units. The storage unit can be any basic storage unit used by a storage apparatus, such as sector, track, block, cluster tap (song), etc. Below, the embodiments of the present invention are explained with example of storage unit.

Besides managing the available storage units on the snapshot volume, the snapshot module can further generate a set of all completed snapshot images, wherein the completed snapshot image set can be divided into a primary bitmap table and a Removed history data CoW bitmap table.

The snapshot module determines that whether the data transmitted from the logical volume should be stored into the available storage units on the snapshot volume after comparing it with the snapshot images and updates the corresponding snapshot image with the address of the stored data.

The snapshot module can be control software composed of computer programs. In a selected embodiment, it can also be a firmware stored in computer hardware and operated thereon to achieve the aforementioned functions. Or in another selected embodiment, the snapshot module can also be formed by hardware so as to achieve foregoing funct ons. The composition of the snapshot module is determined according to the requirement of the actual design.

Figure 1:
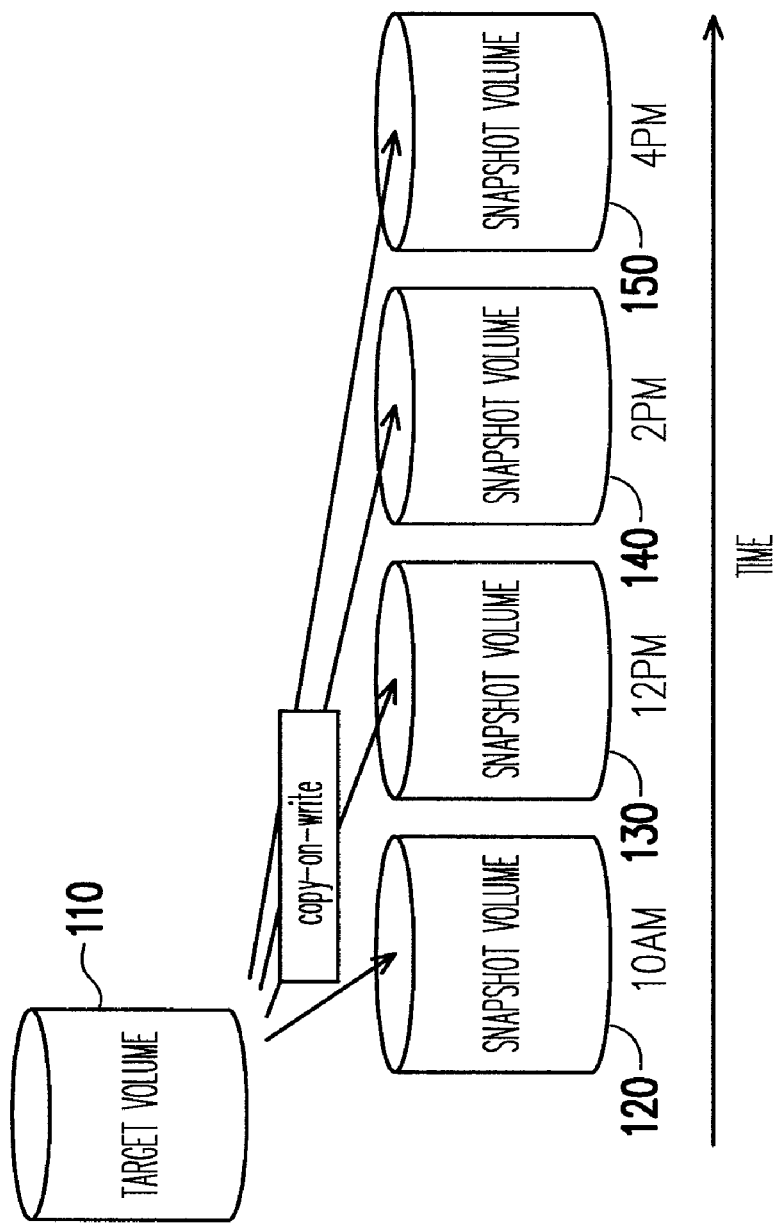
FIG. 1 is a diagram illustrating a conventional Copy-on-Write (CoW) technology.
Figure 2:
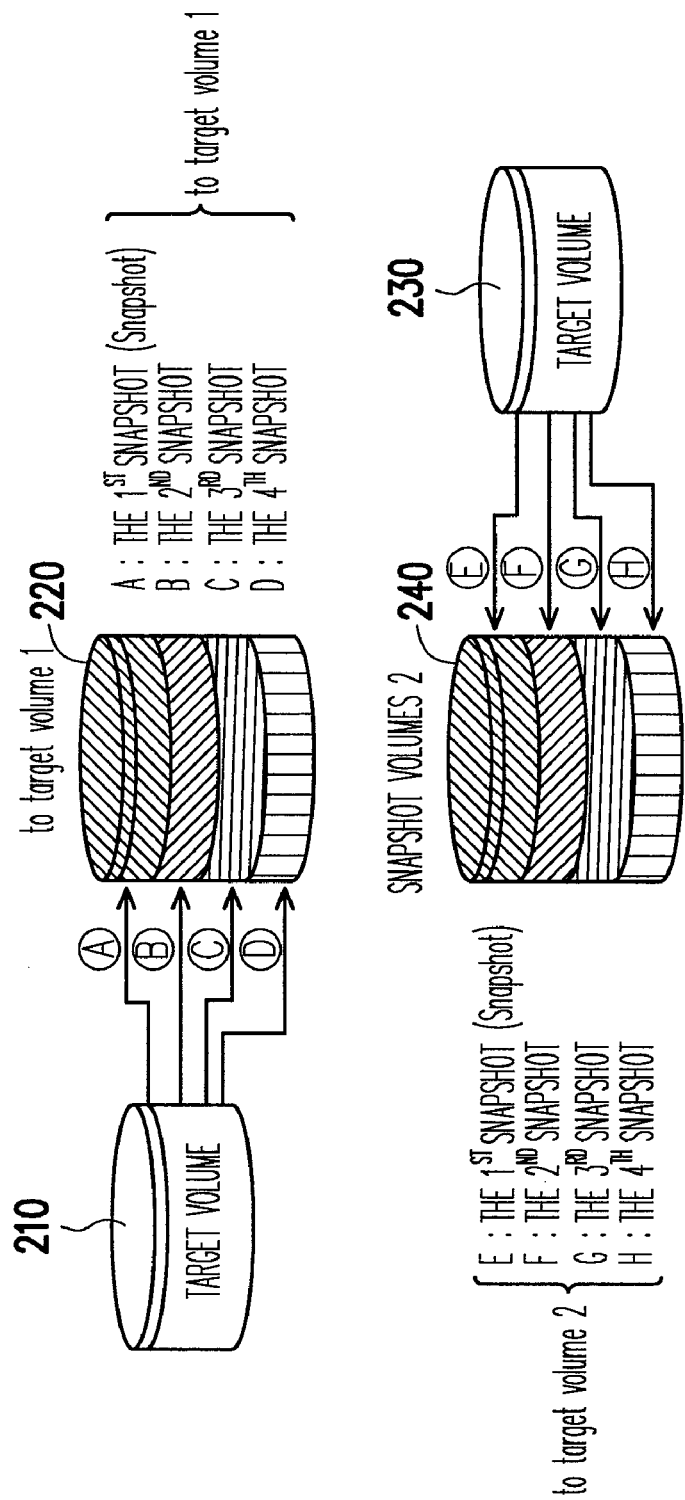
FIG. 2 is a diagram illustrating another conventional CoW technology.
Figure 3:
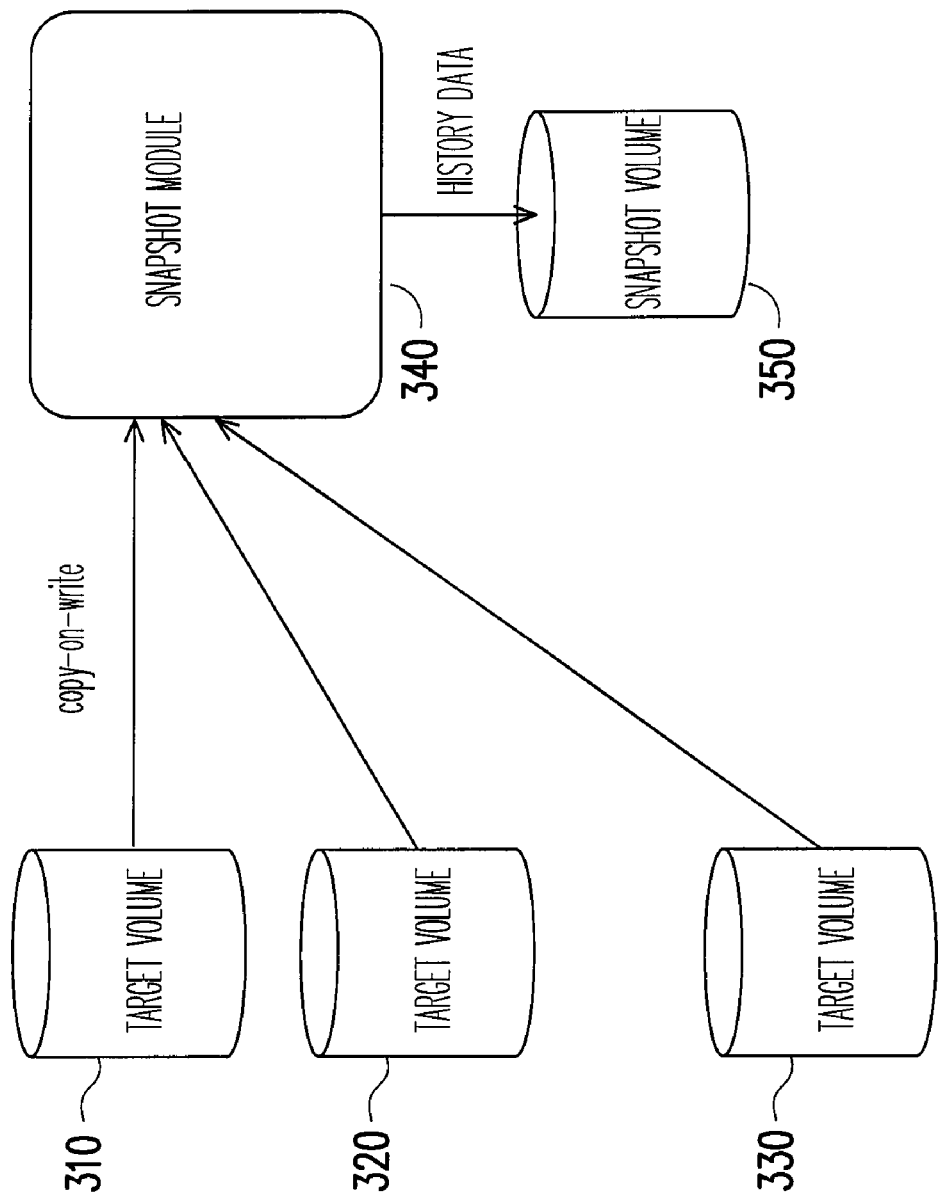
FIG. 3 is a diagram illustrating the structure of a snapshot technology according to an embodiment of the present invention.

According to an exemplary embodiment of the present invention, in the snapshot module described above, as shown in FIG. 3, the target volumes 310, 320, and 330 formed by logical volumes respectively transmit the data to the snapshot module 340 through snapshot writing process, the snapshot writing process can be a Copy-on-Write (referred to thereinafter as "CoW") process in an embodiment but is not limited thereto, any operation which can perform snapshot writing can be applied to implementations of the present invention, and below CoW will be used as example for description. The present structure includes a snapshot volume and a plurality of target volumes, and the history data is determined whether to be written into the snapshot volume 350 through the control of the snapshot module 340 when any of the target volumes starts up CoW mechanism.

Figure 4:
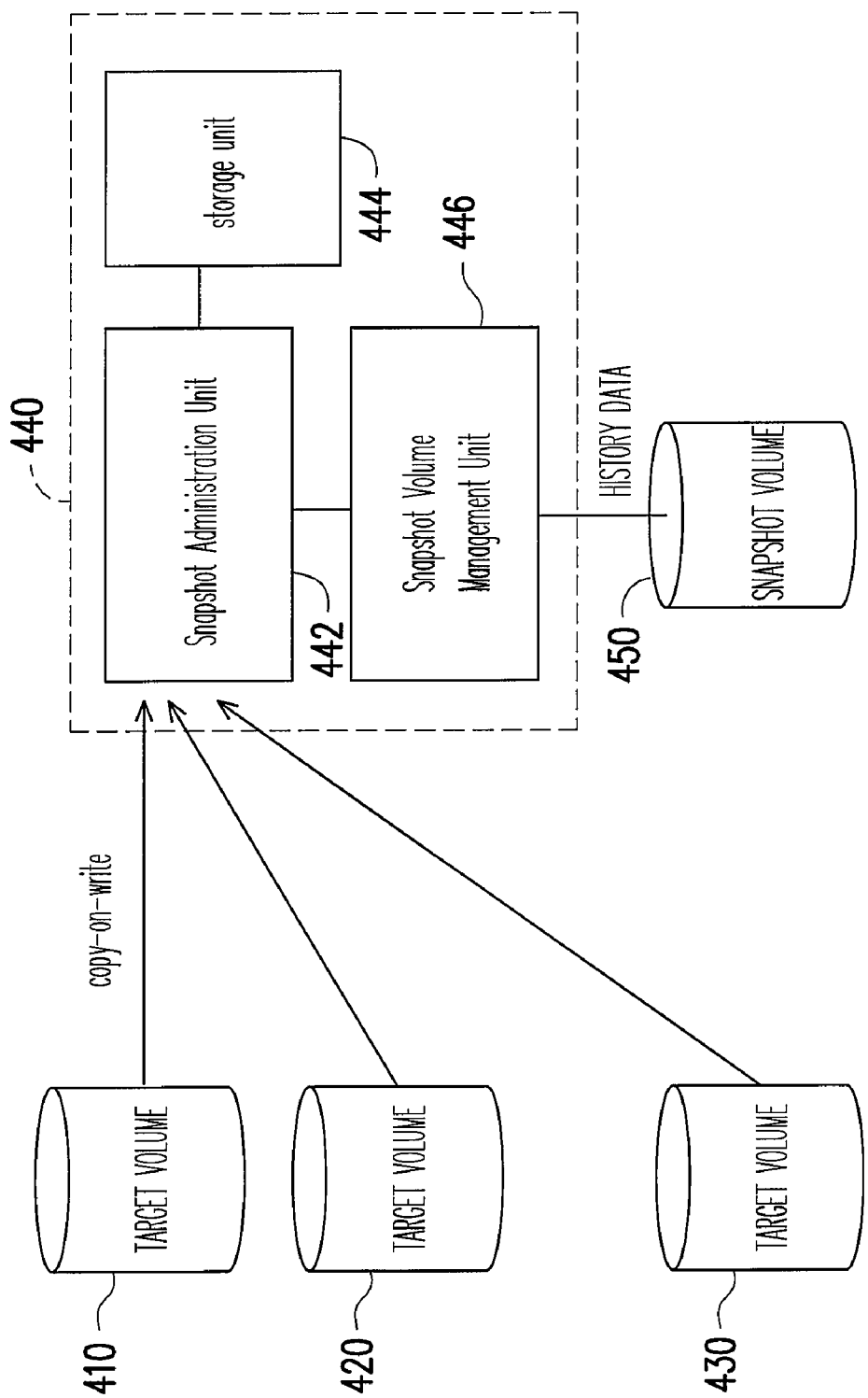
FIG. 4 is a diagram illustrating the structure of a snapshot technology and the composition of a snapshot module according to an embodiment of the present invention.

Please refer to FIG. 4, which is a diagram illustrating the components of a snapshot module according to an exemplary embodiment of the present invention. The target volumes 410, 420, and 430 respectively transmit data to the snapshot module 440 through CoW process, and the data is determined whether to be written into the snapshot volume 450 under the control of the snapshot module 440. In the present embodiment, the snapshot module 440 may include a snapshot administration unit 442, a snapshot image storage unit 444, and a snapshot volume management unit 446. The snapshot volume management unit 446 is used for performing the writing operation to the chunks of the snapshot volume 450 and reporting the available chunks on the snapshot volume 450. The snapshot image storage unit 444 is a set of all the snapshot images. The snapshot administration unit 442 receives the data transmitted from the target volumes such as 410, 420, and 430 in FIG. 4, and determines whether to send the data to the snapshot volume management unit 446 to be stored after comparing the data with the snapshot images stored in the snapshot image storage unit 444, and changes the address of the stored data to the corresponding snapshot images in the snapshot image storage unit 444.

Figure 5A:
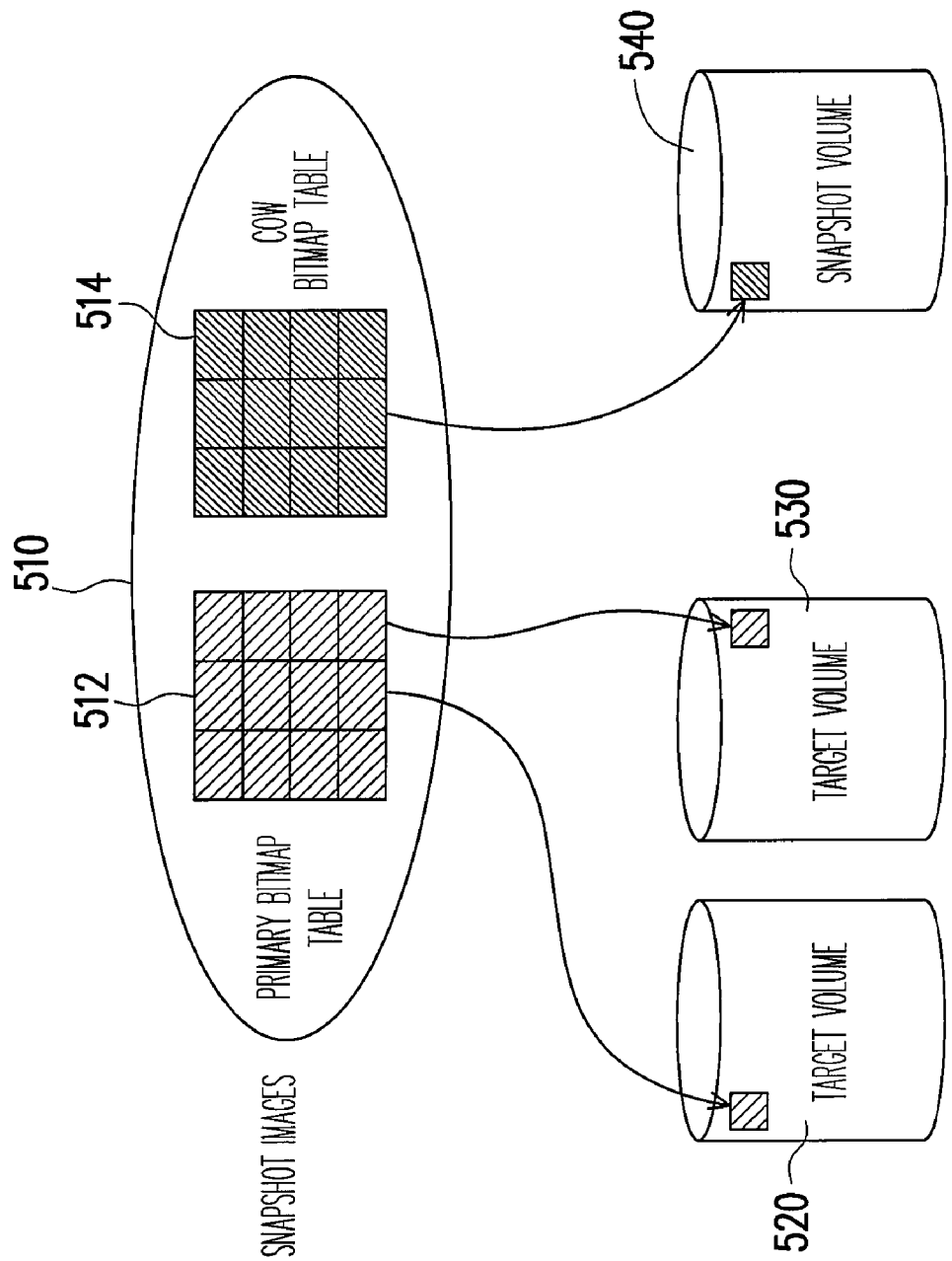
FIG. 5A is a diagram illustrating the composition of a snapshot image, including the correspondence between a primary bitmap table and target volumes and the correspondence between a removed history data CoW bitmap table and a snapshot volume, according to an embodiment of the present invention.

Please refer to FIG. 5A for each snapshot image stored in the snapshot image storage unit 444. In FIG. 5A, the snapshot image 510 is divided into two parts: a primary bitmap table 512 and a removed history data CoW bitmap table 514 (referred to as "CoW bitmap table" thereinafter). In each snapshot image 510, the primary bitmap table 512 includes a plurality of positions for storing storage spaces corresponding to the target volumes, for example, two positions of the primary bitmap table 512 are respectively used for storing a portion of the storage spaces of the target volumes 520 and 530. The positions of the storage spaces are mapped one-to-one to the target volumes. Each position of the CoW bitmap table 514 is used for storing the corresponding position of the snapshot volume 540. The positions of the storage spaces are mapped one-to-one to that of the snapshot volume. In a selected embodiment, the sizes of the primary bitmap table 512 and the CoW bitmap table 514 are the same.

The compositions of the primary bitmap table and the CoW bitmap table are illustrated in FIG. 5B. In FIG. 5B, the CoW bitmap table includes five fields: Chunk_ID, Physical_Device_ID, COW_Flag, Start_Block, and Block_Length. The primary bitmap table includes four fields: Chunk_ID, Physical_Device_ID, Start_Block, and Block_Length.

The foregoing Chunk_ID is the number of each storage unit in the storage device. The Physical_Device_ID is the number of the storage device. The COW_Flag is used for denoting that the history data in the chunk has been updated. The Start_Block represents the starting address used by the Chunk_ID in the foregoing Physical_Device_ID. The Block_Length is the number of blocks used by the chunk of the Chunk_ID.

Figure 6:
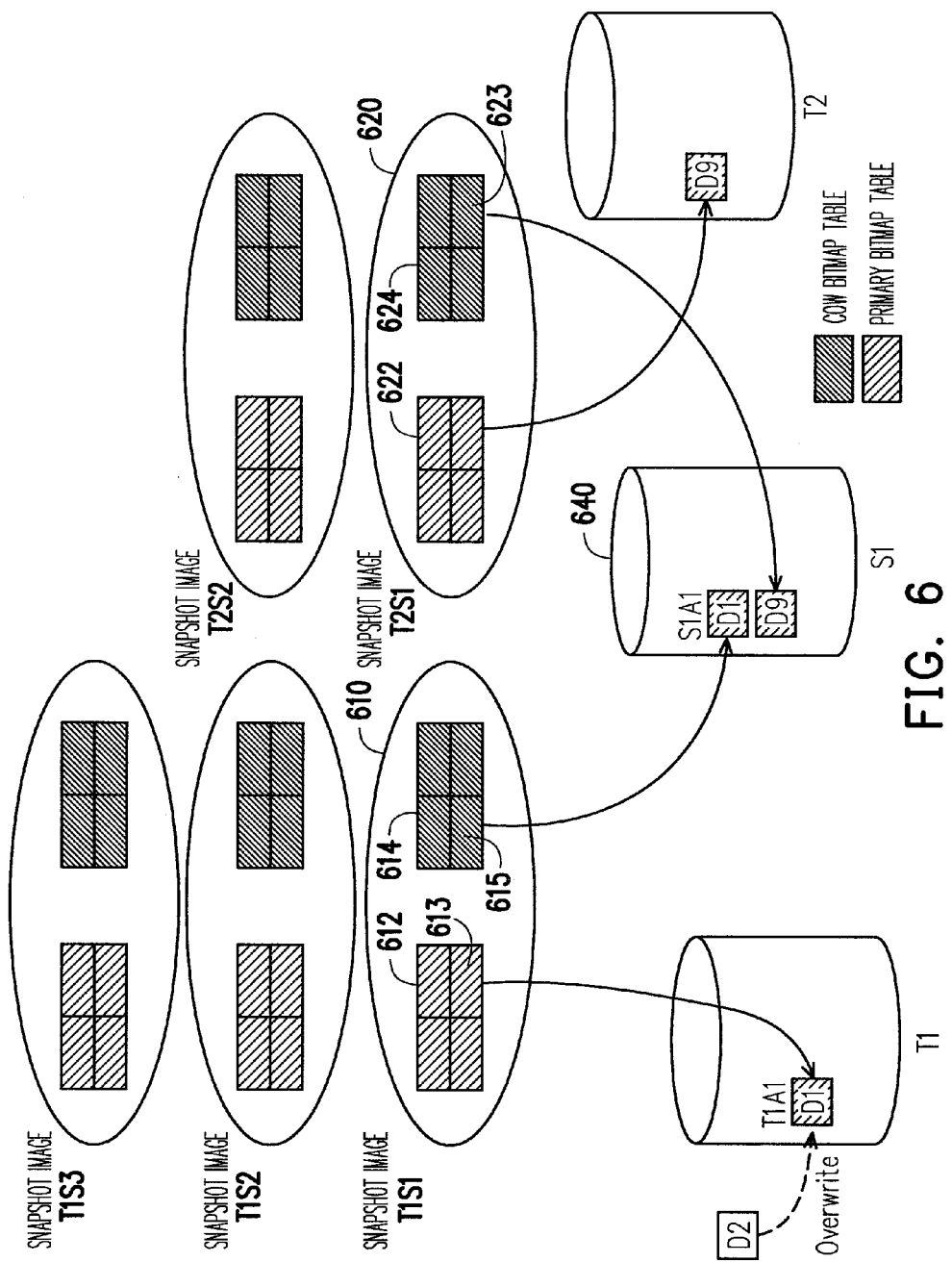
FIG. 6 is a diagram illustrating the access correspondence between snapshot images and target volumes and snapshot volume according to an embodiment of the present invention.

The snapshot technology using the snapshot mechanism in the present invention will be explained regarding the compositions described above. Referring to FIG. 6, the snapshot technology provided by the present invention has the CoW mechanism to write into the target volumes, the preview or data copy mechanism to preview data or copy data from the snapshot images, and also rollback and rollforward recovery mechanisms.

Referring to FIG. 6, it is assumed that there are two target volumes T1, T2 and a snapshot volume S1 in the system, wherein the target volume T1 makes a snapshot image at respectively 8:00AM, 12:00PM, and 6:00PM and the three snapshot images are respectively referred to as T1S1, T1S2, and T1S3. The target volume T2 respectively makes a snapshot image at 9:00AM and 5:00PM and the two snapshot images are respectively referred to as T2S1 and T2S2.

Referring to FIG. 6, it is assumed that data D1 is stored in chunk T1A1 on the target volume T1 originally and is to be overwritten at 1:00PM by the data D2, and the chunk T1A1 has been written at 9:00AM. Here the snapshot module has the snapshot images T1S1 and T1S2 to the target volume T1. When the CoW mechanism is initiated, the data D1 and the chunk T1A1 are transmitted to the snapshot module, and the snapshot administration unit in the snapshot module determines that chunk T1A1 has been considered as history data based on the content of the snapshot image T1S1 at 8:00AM, for example, based on the primary bitmap table 612 and the CoW bitmap table 614, which is the position 613 corresponding to the chunk T1A1 in the primary bitmap table 612, and the position 615 corresponding to the chunk T1A1 in the CoW bitmap table 614. However, the snapshot image T1S2 has not been considered as history data.

Thus, the snapshot administration unit requires the snapshot volume management unit to store D1 in the unused chunk of the snapshot volume 640, which is assumed as chunk S1A1. Then the position 615 in the CoW bitmap table of the snapshot image T1S2 is pointed to the chunk S1A1 of the snapshot volume 640.

As shown in FIG. 6, snapshot image T2S1 also includes a primary bitmap table 622 and a CoW bitmap table 624, and the position 623 in the CoW bitmap table 624 corresponding to a particular chunk of the target volume points to a particular chunk of the snapshot volume 640 and stores data D9.

The snapshot module described above determines that whether the data transmitted from the target volumes should be stored into the available storage unit on the snapshot volume after comparing the data with the snapshot images and updates the corresponding snapshot image with the position of the stored data. Accordingly, the CoW mechanism initiated when writing into the target volumes, the mechanisms for data preview or data copy from snapshot images.

Figure 7:
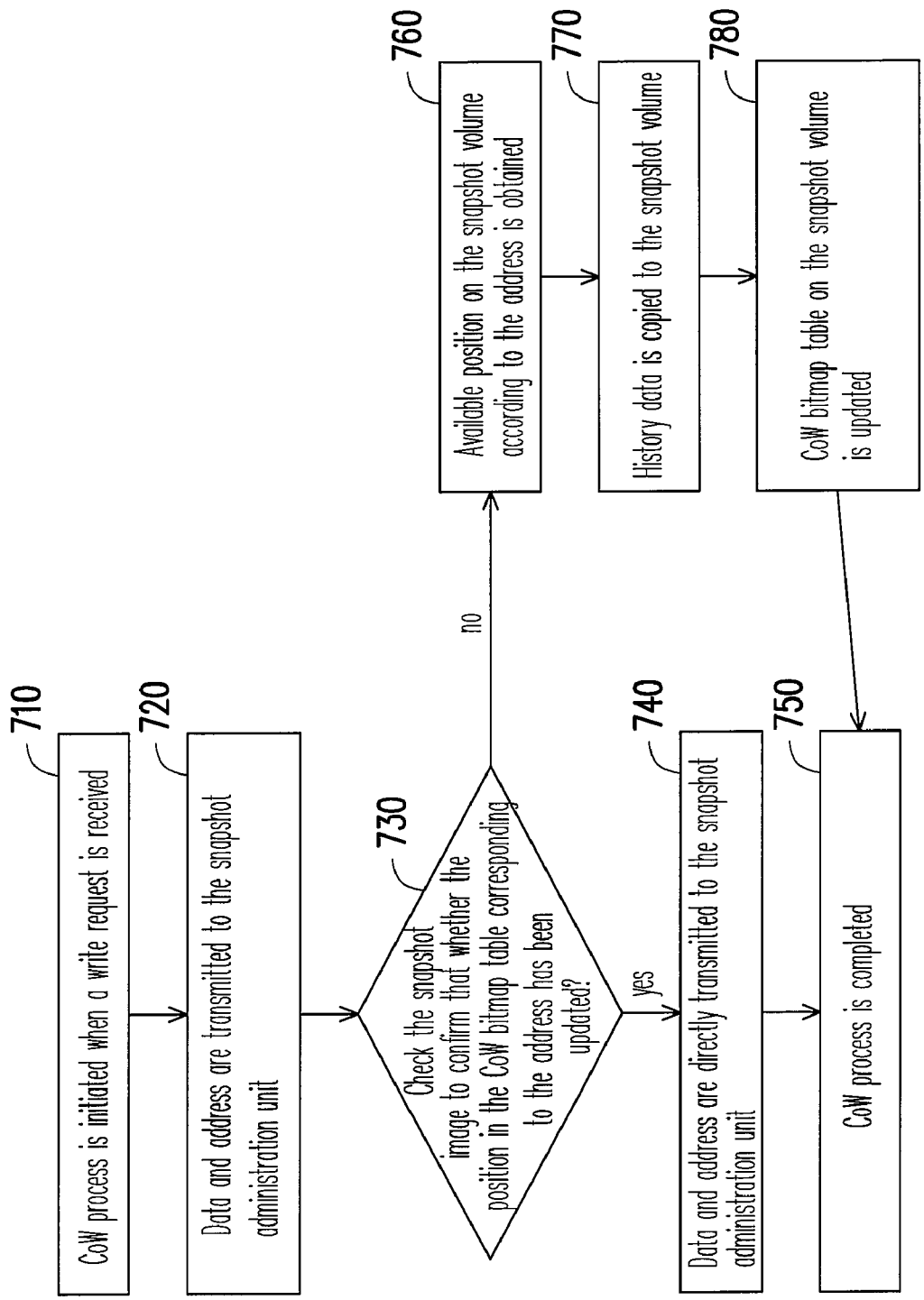
FIG. 7 is a flowchart illustrating the CoW procedure according to an embodiment of the present invention.

FIG. 7 is a flowchart illustrating the CoW procedure according to an embodiment of the present invention. In step 710, the CoW process is initiated when a write request is received. Next, in step 720, the data and address are transmitted to the snapshot administration unit; after that, the snapshot image is checked to confirm that whether the position in the CoW bitmap table corresponding to the address has been updated in step 730. If no, then the data and address are directly transmitted to the snapshot administration unit as in step 740, and after that the CoW process is completed as in step 750. If the position in the CoW bitmap table corresponding to the address has been updated, then step 760 is performed to obtain an available position on the snapshot volume according to the address, and then the history data is copied to the snapshot volume as in step 770. Next, in step 780, the CoW bitmap table on the snapshot volume is updated, and then the CoW process is completed as in step 750. In other words, whether the corresponding position in the CoW bitmap table having been updated has to be checked and it is determined based on this checking result that whether the CoW process is directly entered or entered after backup.

Figure 8:
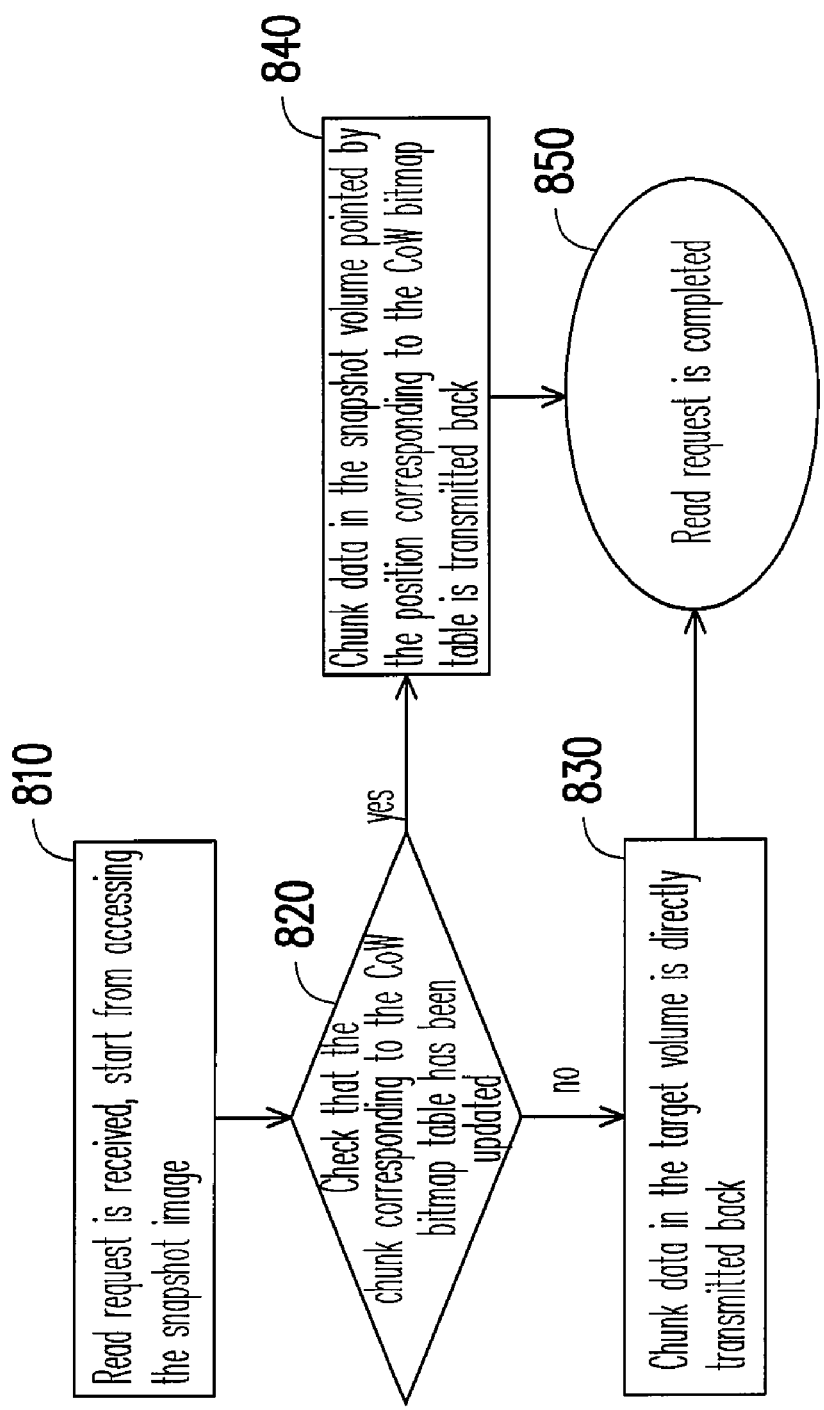
FIG. 8 is an access flowchart illustrating the method of reading history data directly from a snapshot image without performing recovery according to an embodiment of the present invention.

According to the snapshot technology in the present invention, history data can be read from the snapshot image without performing recovery so as to preview the history data or access small quantity of data. FIG. 8 is an access flowchart illustrating the method of reading history data directly from a snapshot image without performing recovery according to an embodiment of the present invention. First, as shown in step 810, when a read request, for example, for preview, is received, the flow is started from accessing the snapshot image. After that, in step 820, it is checked that whether the position in the primary bitmap table corresponding to the read request has been oriented to the CoW bitmap table, that is, it is checked that whether the chunk corresponding to the CoW bitmap table has been updated, if yes, the chunk data in the snapshot volume pointed by the position corresponding to the CoW bitmap table is transmitted back as in step 840. If no, the chunk data in the target volume is directly transmitted back as in step 830. After that the read request is completed as in step 850. Thus, the preview data can be obtained efficiently and quickly.

According to the snapshot technology in the present invention, when the snapshot image is performing recovery mechanism, the status of the target volume can be restored to the status at the time of making any snapshot image. For example, as shown in FIG. 6, please refer to the target volume T2 and snapshot volume S1, and two snapshot images respectively made at 9:00AM and 5:00PM, which are respectively referred to as T2S1 and T2S2. If the user wants the target volume T2 to be restored back to the status at 9:00AM based on the snapshot image T2S1, after the target volume has been restored to the status at 5:00PM by the snapshot image T2S2. Or contrarily, the target volume T2 is restored to the status at 5:00PM based on the snapshot image T2S2 after it is restored to the status at 9:00AM by the snapshot image T2S1. This mechanism is different from conventional snapshot technologies, which cannot recover the snapshot file completed at any point of time.

Figure 9:
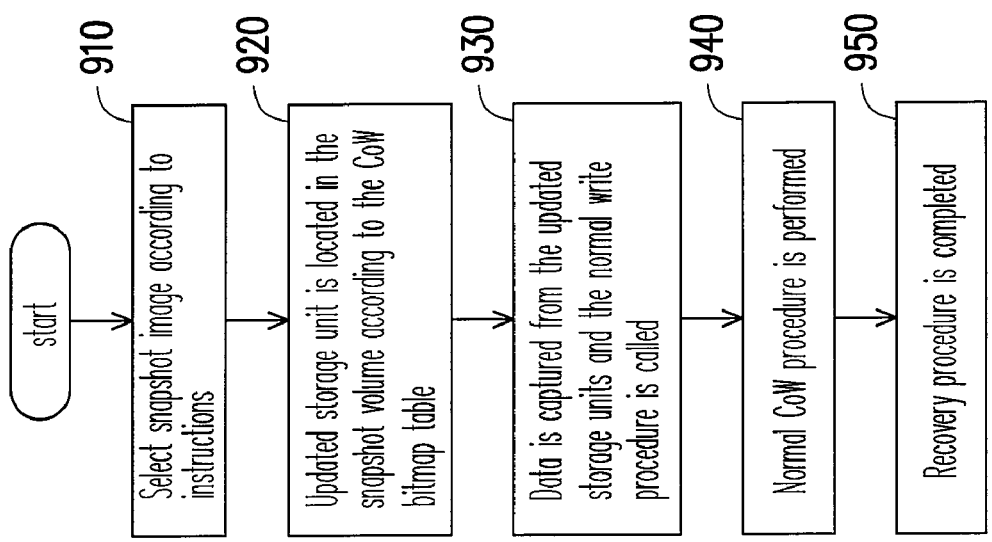
FIG. 9 is a flowchart illustrating that the target volumes can be restored to the status at the time of making any snapshot image when performing recovery status mechanism according to an embodiment of the present invention.

The foregoing operation flow is as shown in FIG. 9, when the operation of status recovery is started, a snapshot administration unit of a snapshot module according to an exemplary embodiment of the present invention selects snapshot image according to instructions, as in step 910. After that, the updated storage unit is located in the snapshot volume according to the CoW bitmap table as in step 920. The storage unit can be any basic storage unit used by storage devices, such as sector, track, block, cluster, etc.(tape:song) When all the updated storage units have been located, as in step 930, data is captured from the updated storage units and the normal write procedure is called, then as in step 940, the normal CoW procedure is performed so as to write the captured data into the target volume and then the recovery procedure is completed.

According to the snapshot technology in the present invention, through a control mechanism of a snapshot module between the logical volume and the snapshot volume, the history data is controlled by the snapshot module and written into the snapshot volume when the logical volume initiate the CoW operation, or the history data is read from the snapshot volume and transmitted back to the logical volume when performing data recovery. The snapshot module can determine that whether the data transmitted from the logical volume should be stored into the available storage unit on the snapshot volume after comparing the data with the snapshot images, and updates the corresponding snapshot image with the address of the stored data. The mechanism proposed in the present invention can be applied to a snapshot technology using snapshot module has CoW mechanism when writing target volumes and preview or data copy mechanism to preview and copy data from snapshot images, and rollback and rollforward recovery mechanism.

Since it is not necessary to copy multiple history data, the snapshot technology in the present invention is very efficient and waste in time can be avoided. In addition, because it's not necessary to reserve too much reserved space and space for multiple history data, the snapshot technology of the present invention avoids the waste in space compared to conventional snapshot technologies. According to the actual implementation, space waste can be reduced about 80%.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A snapshot data managing method of a data processing system, comprising:
   providing a snapshot storage unit, used for storing the data created by snapshotting a plurality of target storage units and creating a plurality of snapshot images according to created data;
   using a first address table and a second address table in a snapshot image respectively corresponding to a plurality of storage units of the target storage units and the snapshot storage unit; and
   restoring the status of the target storage units to the status of a predetermined time ago according to the snapshot images.

2. The snapshot data managing method as claimed in claim 1, wherein the target storage units corresponding to the first address table are used for storing the data generated by the data processing system, and the snapshot storage unit corresponding to the second address table is used for storing a plurality of history data so as to avoid overwriting the data stored in the target storage units.

3. The snapshot data managing method as claimed in claim 2, wherein the first address table includes a list of addresses corresponding to the storage units of the target storage units, wherein the addresses of the storage units are mapped one-to-one to the target storage units.

4. The snapshot data managing method as claimed in claim 2, wherein the second address table includes a list of addresses corresponding to the storage units of the snapshot storage unit, wherein the address lengths of the storage units are mapped one-to-one to the target storage units.

5. The snapshot data managing method as claimed in claim 1, wherein the sizes of the first address table and the second address table in the snapshot image are the same.

6. The snapshot data managing method as claimed in claim 1 further comprising a snapshot module used for managing the snapshot images and controlling the storage units of the snapshot storage unit.

7. The snapshot data managing method as claimed in claim 6, wherein the snapshot module is a software module, which can be used in the data processing system.

8. The snapshot data managing method as claimed in claim 6, wherein the snapshot module comprises:
   a snapshot storage unit management unit, used for writing into the storage units of the snapshot storage unit and reporting the available storage units in the snapshot storage unit;
   a snapshot image storage unit, used for storing the created snapshot images;
   a snapshot administration unit, receiving the data transmitted from the target storage units, determining whether to transmit the data to the snapshot storage management unit to store the data into the snapshot storage unit after comparing the data with the snapshot images stored in the snapshot image storage unit, updating the snapshot image corresponding to the data with the address of the stored data.

9. The snapshot data managing method as claimed in claim 1 further comprising that while a write request being received, checking whether the snapshot image of the target storage unit corresponding to the write request having been created; and checking that whether the addresses of the storage units in the second address table corresponding to the addresses of the storage units of a read request having been updated, if any address in the second address table having been not updated, performing a Copy-on-Write (CoW) procedure to store the data in the storage units corresponding to the write request into the snapshot storage unit, and updating the addresses of the storage units which having not been updated in the second address table.

10. The snapshot data managing method as claimed in claim 1 further comprising that while a read request for preview being received, selecting one of the created snapshot images; and obtaining an original address corresponding to the read request from the first address table, obtaining the address of a history data corresponding to the read request from the second address table, capturing data from the storage unit of the target storage unit corresponding to the original address if the address of the history data having not been updated, capturing data from the storage unit of the snapshot storage unit corresponding to the address of the history data if the address of the history data having been updated.

11. The snapshot data managing method as claimed in claim 1 further comprising that while a recovery request being received, selecting one of the created snapshot images;

obtaining an original address corresponding to the recovery request from the first address table, obtaining the address of a history data corresponding to the recovery request from the second address table;

obtaining the history data from the snapshot storage unit according to the address of the history data; and writing the history data into the storage unit of the target storage unit corresponding to the original address.

12. The snapshot data managing method as claimed in claim 11, wherein the created snapshot images are selected according to the snapshot images created at the predetermined time of the target storage unit to be recovered.

13. The snapshot data managing method as claimed in claim 1, wherein the storage units comprise at least a sector, a track, block, a cluster, a disk, a tape(song) or a volume.

14. A snapshot method of a data processing system, applicable to a snapshot storage unit and a plurality of target storage units, the snapshot method comprising:

creating a plurality of snapshot images sequentially, storing the created snapshot images into the snapshot storage unit, wherein each of the snapshot images has a first address table and a second address table respectively corresponding to a plurality of storage units of the target storage units and the snapshot storage unit;

selecting the snapshot image of the target storage unit corresponding to the recovery request according to an appointed time and a recovery request;

obtaining an original address corresponding to the recovery request from the first address table, obtaining the address of a history data corresponding to the recovery request from the second address table;

obtaining the history data from the snapshot storage unit according to the address of the history data; and writing the history data into the storage unit of the target storage unit corresponding to the original address.

15. The snapshot method as claimed in claim 14, wherein the first address table includes a list of addresses corresponding to the storage units of the target storage units, wherein the addresses of the storage units are mapped one-to-one to the target storage units.

16. The snapshot method as claimed in claim 14, wherein the second address table includes a list of addresses corresponding to the storage units of the snapshot storage unit, wherein the address lengths of the storage units are mapped one-to-one to the target storage units.

17. The snapshot method as claimed in claim 14, wherein the sizes of the first address table and the second address table in the snapshot image are the same.

18. A snapshot method of a data processing system, applicable to a snapshot storage unit and a plurality of target storage units, the snapshot method comprising:

creating a plurality of snapshot images sequentially, storing the created snapshot images into the snapshot storage unit, wherein each of the snapshot image includes a first address table and a second address table respectively corresponding to a plurality of storage units of the target storage units and the snapshot storage unit;

selecting the snapshot image of the target storage unit corresponding to the read request according to an appointed time and a read request for preview;

obtaining an original address corresponding to the recovery request from the first address table, obtaining the address of a history data corresponding to the recovery request from the second address table; and capturing data from the storage unit of the target storage unit corresponding to the original address if the address of the history data having not been updated, capturing data from the storage unit of the snapshot storage unit corresponding to the address of the history data if the address of the history data having been updated.

19. The snapshot method as claimed in claim 18, wherein the first address table includes a list of addresses corresponding to the storage units of the target storage units, wherein the addresses of the storage units are mapped one-to-one to the target storage units.

20. The snapshot method as claimed in claim 18, wherein the second address table includes a list of addresses corresponding to the storage units of the snapshot storage unit, wherein the address lengths of the storage units are mapped one-to-one to the target storage units.

21. The snapshot method as claimed in claim 18, wherein the sizes of the first address table and the second address table in the snapshot image are the same.

22. A snapshot data processing apparatus, comprising:

a snapshot storage unit, used for storing the data created when snapshotting a plurality of target storage units and generating a plurality of snapshot images accordingly, wherein each of the snapshot image includes a first address table and a second address table respectively corresponding to a plurality of storage units of the target storage units and the snapshot storage unit; and a snapshot module, used for managing the snapshot images and controlling the storage units of the snapshot storage unit, restoring the status of the target storage units to the status of a predetermined time ago according to the snapshot images.

23. The snapshot data processing apparatus as claimed in claim 22, wherein the snapshot module comprises:

a snapshot storage unit management unit, used for writing into the storage units of the snapshot storage unit and reporting the available storage units in the snapshot storage unit;

a snapshot image storage unit, used for storing the created snapshot images; and a snapshot administration unit, receiving the data transmitted from the target storage units, determining whether to transmit the data to the snapshot storage management unit to store the data into the snapshot storage unit after comparing the data with the snapshot images stored in the snapshot image storage unit, updating the snapshot image corresponding to the data with the address of the stored data.

24. The snapshot data processing apparatus as claimed in claim 22, wherein the target storage units corresponding to the first address table are used for storing the data created by the data processing system, and the snapshot storage unit corresponding to the second address table is used for storing a plurality of history data so as to avoid overwriting the data stored in the target storage units.

25. The snapshot data processing apparatus as claimed in claim 24, wherein the first address table includes a list of addresses corresponding to the storage units of the target storage units, wherein the addresses of the storage units are mapped one-to-one to the target storage units.

26. The snapshot data processing apparatus as claimed in claim 24, wherein the second address table includes a list of addresses corresponding to the storage units of the snapshot storage unit, wherein the address lengths of the storage units are mapped one-to-one to the target storage units.

* * * * *